US010443630B2

(12) United States Patent
Collins (10) Patent No.: US 10,443,630 B2
(45) Date of Patent: Oct. 15, 2019

(54) METHOD FOR PRODUCING SERVO VALVE MANIFOLDS AND MANIFOLD WITH CURVILINEAR FLOW GALLERY OF SINGLE PIECE CONSTRUCTION

(71) Applicant: BLAGDON ACTUATION RESEARCH LIMITED, Blagdon, Bristol (GB)

(72) Inventor: Andrew John Collins, Somerset (GB)

(73) Assignee: BLAGDON ACTUATION RESEARCH LIMITED, Bristol (GB)

( * ) Notice: Subject to any disclaimer, the term of this patent is extended or adjusted under 35 U.S.C. 154(b) by 13 days.

(21) Appl. No.: 14/897,163

(22) PCT Filed: Jun. 11, 2014

(86) PCT No.: PCT/GB2014/051801
§ 371 (c)(1),
(2) Date: Dec. 9, 2015

(87) PCT Pub. No.: WO2014/199158
PCT Pub. Date: Dec. 18, 2014

(65) Prior Publication Data
US 2016/0131165 A1    May 12, 2016

(30) Foreign Application Priority Data

Jun. 12, 2013  (GB) .................................. 1310452.6
Jan. 30, 2014  (GB) .................................. 1401561.4

(51) Int. Cl.
*F16B 13/08*     (2006.01)
*F16K 11/07*     (2006.01)
(Continued)

(52) U.S. Cl.
CPC ........ *F15B 13/0814* (2013.01); *B22F 3/1055* (2013.01); *B22F 5/10* (2013.01);
(Continued)

(58) Field of Classification Search
CPC ....... Y10T 137/87885; Y10T 137/6065; F16K 27/041; F16K 11/07; B33Y 80/00;
(Continued)

(56) References Cited

U.S. PATENT DOCUMENTS 4,339,737 A    7/1982  Meyers et al.
4,452,423 A    6/1984  Beblavi et al.
(Continued)

FOREIGN PATENT DOCUMENTS

CN     201636104 U     11/2010
DE    102006045251 A1    4/2008
(Continued)

OTHER PUBLICATIONS

International Search Report issued in PCT/GB2014/051801 dated Oct. 10, 2014.
(Continued)

*Primary Examiner* — Atif H Chaudry
(74) *Attorney, Agent, or Firm* — Ostrolenk Faber LLP (57) ABSTRACT

A method for producing a manifold is disclosed, wherein an additive manufacturing process is used to produce the manifold.

11 Claims, 4 Drawing Sheets

(51) Int. Cl.
*F16K 27/04* (2006.01)
*B29C 64/00* (2017.01)
*B22F 5/10* (2006.01)
*B33Y 80/00* (2015.01)
*F15B 13/08* (2006.01)
*B22F 3/105* (2006.01)
*F15D 1/00* (2006.01)
*B29L 31/00* (2006.01)
*B33Y 10/00* (2015.01)

(52) U.S. Cl.
CPC .......... *B29C 64/00* (2017.08); *F15B 13/0807* (2013.01); *F15D 1/00* (2013.01); *F16K 11/07* (2013.01); *F16K 27/041* (2013.01); *B29L 2031/7506* (2013.01); *B33Y 10/00* (2014.12); *B33Y 80/00* (2014.12); *F15B 13/0871* (2013.01); *Y02P 10/295* (2015.11); *Y10T 137/6065* (2015.04); *Y10T 137/87885* (2015.04)

(58) Field of Classification Search
CPC .......... B22F 5/10; Y02P 10/295; B29C 64/00; B29L 2031/7506; F15B 13/0871; F15B 13/0814
See application file for complete search history.

(56) References Cited

U.S. PATENT DOCUMENTS

| | | | |
|---|---|---|---|
| 4,793,377 A | 12/1988 | Haynes et al. | |
| 4,794,845 A * | 1/1989 | Vick | F15B 9/09 137/625.23 |
| 5,197,516 A * | 3/1993 | Smietana | F15B 13/043 137/625.62 |
| 5,597,014 A | 1/1997 | Vick | |
| 5,996,626 A | 12/1999 | Thomas | |
| 6,000,431 A | 12/1999 | Langkamp | |
| 6,475,424 B1 | 11/2002 | van Manen | |
| 7,322,375 B2 * | 1/2008 | Goldfarb | F16K 11/085 137/625.22 |
| 8,485,497 B2 | 7/2013 | Alessandro | |
| 2006/0254917 A1 * | 11/2006 | Henry | C07K 1/26 204/456 |
| 2011/0020856 A1 * | 1/2011 | Poo | C12M 23/12 435/29 |
| 2012/0074051 A1 * | 3/2012 | Gebauer | G01N 30/6017 210/198.2 |
| 2013/0244856 A1 * | 9/2013 | Nash | B01D 21/262 494/4 |
| 2014/0067084 A1 * | 3/2014 | Soss | A61F 2/78 623/34 |
| 2014/0084583 A1 * | 3/2014 | Hemingway | B29C 67/0055 285/374 |
| 2014/0267116 A1 * | 9/2014 | Weiner | A61F 5/05866 345/173 |
| 2014/0276345 A1 * | 9/2014 | Silin | A61M 1/3655 604/9 |

FOREIGN PATENT DOCUMENTS

| | | |
|---|---|---|
| EP | 0713979 A2 | 5/1996 |
| EP | 1 167 778 A1 | 1/2002 |
| EP | 2184462 A1 | 5/2010 |
| GB | 2358368 | 7/2001 |
| JP | 2004263592 A | 9/2004 |
| JP | 2006164831 A | 6/2006 |
| WO | 95/20781 A1 | 8/1995 |
| WO | 2012/112262 | 8/2012 |
| WO | 2013/033726 | 3/2013 |
| WO | 2013/160198 A1 | 10/2013 |

OTHER PUBLICATIONS

Notification of Transmittal of the International Search Report and the Written Opinion of the International Searching Authority, or the Declaration issued in PCT/GB2004/051801 dated Oct. 10, 2014.
Great Britain Search Report issued in GB Appln. No. 1310452.6 dated Dec. 6, 2013.
Great Britain Search Report issued in GB Appln. No. 1401561.4 dated Feb. 17, 2014.
Great Britain Search Report issued in GB Appln. No. 1310452.6 dated May 22, 2014.

* cited by examiner

METHOD FOR PRODUCING SERVO VALVE MANIFOLDS AND MANIFOLD WITH CURVILINEAR FLOW GALLERY OF SINGLE PIECE CONSTRUCTION

CROSS REFERENCE TO RELATED APPLICATIONS

This application is a § 371 National Phase Application of International Application No. PCT/GB2014/051801 filed Jun. 11, 2014, which claims the benefit of Great Britain Patent Application No. 1310452.6, filed on Jun. 12, 2013 and Great Britain Patent Application No. 1401561.4 filed Jan. 30, 2014, the disclosures of which are hereby fully incorporated herein by reference.

TECHNICAL FIELD

The present invention concerns improvements in and relating to the manufacture of servo valve manifolds.

BACKGROUND OF THE INVENTION

Servo valves are used in a wide variety of industries to control the movement of hydraulic or pneumatic actuators in response to an input signal and are employed in industries where precise control of an actuator is required, for example in the aerospace industry. Servo valves alter the flow of a fluid through the valve in order to control the position, velocity, acceleration or force generated by an actuator, for example a hydraulic or pneumatic cylinder or motor.

A servo valve typically comprises a moving element (spool) and a fixed element. The relative movement of these two elements controls the flow of fluid through the valve.

A fluid manifold may be defined as any element which provides at least one flow path for fluids between one or more fluid inputs and one or more fluid outputs. As such, manifolds are found in many different applications. A typical servo valve manifold differs from manifolds in general in that it must accommodate a moveable spool within a cavity formed inside the manifold. As it is the position of the spool within the cavity which controls the fluid flow through the servo valve the internal dimensions of the manifold, and in particular of the cavity and the flow ports which open onto the cavity, must be produced to tight tolerances in order to achieve the necessary degree of precision in the control of the flow.

In contrast to the manifolds that may be found in other applications, size is commonly a key driver in servo valve design. For example, in aerospace applications the space and weight limitations within an aircraft may place severe constraints on the size of servo valve that can be accommodated.

A servo valve manifold may also include further cavities into which one or more flow management devices may be inserted. Flow management devices, for example check valves, flow restrictors and fluid filters act to alter the flow and ensure the smooth functioning of the fluid system of which the manifold forms a part.

Typically, servo valve manifolds are created by subtractive manufacturing processes. For example, a servo valve manifold may be created by removing material from a billet by machining. Alternatively, a servo valve manifold may be created by a combination of casting and subtractive manufacturing processes. For example the basic form of the manifold may be cast and the flow paths then created by removing material by machining (e.g. boring). Where greater precision is required a sleeve may be inserted within the manifold to isolate precision features from pressure and thermal distortions within the manifold and to enable the use of different materials, for example materials which have improved mechanical properties or are available at lower cost. Such manufacturing processes are relatively complex and involve a number of steps as well as a variety of different production techniques. These manufacturing processes also place limitations upon the type of manifold that can be produced. Consequently, it would be advantageous to provide an improved manufacturing process which is less complex and allows more flexibility in the design of servo valve manifolds. It would also be advantageous to provide an improved manifold which exploits the increased flexibility offered by such an improved manufacturing process.

SUMMARY OF THE INVENTION

According to a first aspect of the invention there is provided a method for producing a servo valve manifold, wherein the manifold is formed using an additive manufacturing process.

Additive manufacture, also known as 3D printing, is a term applied to processes whereby three-dimensional articles are manufactured by building up successive layers of material in different shapes. This is in contrast to traditional manufacturing techniques (known as subtractive manufacturing) such as milling or boring in which material is removed in order to create the final form of an article. Using an additive manufacturing technique allows the manifold to have a single piece construction, whilst still incorporating the features included in a manifold produced using traditional manufacturing techniques. Moreover, the design flexibility offered by the additive manufacturing techniques means that the design of the manifold itself may be improved. Thus, the use of additive manufacturing techniques may result in an improved design of manifold which is easier to produce.

At least one curvilinear flow gallery may be formed within the manifold during its production. The method may further include the step of: forming at least one curvilinear flow gallery within a single piece manifold during the additive manufacturing process. Thus, the design of the valve may be improved by using an additive manufacturing process to create a curvilinear flow gallery within the manifold. Varying the curvature of the galleries allows the arrangement of the galleries within the manifold to be optimised. Curvilinear flow galleries may be packed more tightly within the body of the manifold than rectilinear galleries thereby reducing the space occupied by the manifold. Gradually varying the curvature of the galleries when connecting flow paths also allows fluid momentum to be maintained (as compared with the loss of momentum experienced when a fluid must flow around a right-angled bend for example).

At least one flow control feature may be formed by the manifold itself. The at least one flow control feature may be formed within the manifold during its production. The at least one flow control feature may be formed as a single piece with the manifold body. The method may also include the step of: forming at least one flow control feature as part of a single piece manifold during the additive manufacturing process.

The flow control feature formed as part of the single piece manifold may be a fluid filter. Thus, the method may include the step of: forming a fluid filter within a single piece manifold during the additive manufacturing process.

The flow control feature formed as part of the single piece manifold may be a flow restrictor. Thus, the method may include the step of: forming a flow restrictor within a single piece manifold during the additive manufacturing process.

The flow control feature formed as part of the single piece manifold may be a sleeve. Thus, the method may include the step of: forming a sleeve within a single piece manifold during the additive manufacturing process.

Thus, the process of manufacturing the manifold may be further improved (simplified) by using the additive manufacturing process to form flow features as part of the single piece manifold. Additionally, the performance of a single piece manifold may be improved by including control features therein.

A check valve may be formed at least in part by the single piece manifold. Thus, the method may include the step of: forming at least part of a check valve, for example, a moveable valve member, within a single piece manifold during the additive manufacturing process.

The method of forming the check valve may include one or more of the following steps:
  providing a single piece manifold using the additive manufacturing process including a cavity, defined by an inner surface of the manifold, having a valve locating portion and a valve opening;
  providing a valve member including at least one protrusion within the cavity using the additive manufacturing process; and/or
  exerting a force on the valve member such that the at least one protrusion of the valve member engages the valve locating portion thereby locating the valve member within the cavity;
  exerting a force on the valve member such that the valve member is brought into contact with the inner surface of the manifold that defines the valve opening.

The valve member may be displaced axially within the cavity such that the at least one protrusion engages the valve locating portion. The valve member may be twisted within the cavity such that the at least one protrusion engages the valve locating portion.

The valve locating portion may be an area of the cavity having a reduced diameter. The method may involve pushing or pulling the valve member such that the at least one protrusion is forced past the area of reduced diameter. The method may involve the step of twisting the valve member such that the at least one protrusion passes the area of reduced diameter. Thus, the method may involve exerting a force on the valve member, in a first direction, such that the at least one protrusion of the valve member passes the area of reduced diameter. Thus, the valve member may be located within the cavity by the contact between the protrusion and the area of reduced diameter.

The steps of locating the valve member within the cavity and bringing the valve member into contact with the inner surface of the manifold which defines the valve opening may be carried out simultaneously. Thus, the method may include the step of exerting a force on the valve member, in a first direction, such that the at least one protrusion of the valve member passes the area of reduced diameter and the valve member is brought into contact with the inner surface of the manifold that defines the valve opening.

The valve locating portion may be a recess formed by the inner surface of the cavity. The valve locating portion may be a slot in the inner surface of the cavity. For example, the valve locating portion may be an L-shaped slot such that the valve locating portion and protrusion form a bayonet fitting.

The valve member may be elastically deformable. The valve member may act as a compression spring. The method may include the step of axially compressing the valve member. The valve member may act as a torsion spring. The method may include the step of twisting one end of the valve member relative to the other end of the valve member.

The valve member may elastically deform as it passes the area of reduced diameter. The valve member may deform radially as it passes the area of reduced diameter. Thus, the sides of the valve member may be pushed inwards as they pass the area of reduced diameter before returning to their original shape once they are past. Once the at least one protrusion of the valve member is past the area of reduced diameter the check valve may be maintained in a first, axially compressed, state by contact with the inner surface of the manifold. The valve member may be maintained in an axially compressed state as a result of the engagement between the valve locating portion and the at least one protrusion. In the first state the contact of the at least one protrusion at a first end of the valve member against the internal surface of the manifold at the area of reduced diameter and the contact of a second, opposite, end of the valve member against the inner surface of the manifold defining the valve opening may maintain the valve member in a compressed state. Thus, the area of reduced diameter may prevent the valve member expanding.

A stylus may be inserted into the cavity in order to exert force on the valve member in the first direction. Alternatively, the force used to urge the valve member in the first direction may be generated by hydraulic pressure. For example, a sphere may be inserted into the cavity above the valve member and under the action of a pressurised fluid the sphere may push on the valve member thereby activating the locking barb.

In order for a fluid to flow through the check valve, the pressure of the fluid must generate sufficient force on the valve member to compress the valve member further and thereby create a gap between the inner surface of the cavity which defines the valve opening and the valve member allowing fluid to flow through the valve.

According to a second aspect of the invention there is provided a manifold including at least one curvilinear flow gallery, characterised in that the manifold is of a single piece construction. Thus, the design of the manifold may be improved without increasing the complexity of the manufacturing process.

The manifold may include at least one flow gallery. Each gallery may form a fluid flow path. The flow gallery may form a flow path between a fluid inlet and a fluid outlet. Thus, fluid may flow along the fluid gallery. The manifold may include a plurality of fluid galleries. It may be that the at least one flow gallery is not straight, but follows a nonlinear path in three-dimensional space. Thus, the gallery may curve within the manifold. The manifold may include at least one flow gallery in which the curvature of the gallery varies along the majority of the length of the gallery. The manifold may include at least one flow gallery with a continuously varying curvature. The curvilinear gallery may be incorporated within the form of the manifold produced by the additive manufacturing process.

As the additive manufacturing process involves building up layers of material in order to form a finished shape, there may be limitations as to the degree of overhang (the size of a horizontal projection without a supporting layer below) that can be achieved in an article produced using this method. Thus, it may be that the gradient of the sides of one half of the flow gallery (the upper half during production)

are steeper than the gradient of the sides in the other half (the lower half during production) of the gallery. It may be that the cross-section of the at least one gallery is not circular. It may be that the at least one gallery has a tear-drop shaped cross-section.

The cross-section of the at least one gallery may vary along at least a portion of the length of the gallery. Thus, the at least one flow gallery may have a variable cross-section. In this manner the packing of the galleries within the servo valve manifold may be optimised while maintaining fluid momentum. The cross-section of the gallery may vary along the majority of the length of the gallery. The variation in the cross-section of the gallery may be incorporated within the form of the manifold produced by the additive manufacturing process.

The at least one flow gallery may branch into two sub-galleries. A sub-gallery may have a reduced cross-sectional area as compared to the gallery that it branches off from. The at least one flow gallery may branch into more than two sub-galleries. For example, the at least one flow gallery may branch into three sub galleries. Two or more sub-galleries may merge to form a single gallery. Thus, the manifold may contain a plurality of galleries and sub-galleries which branch into, and are produced by, the merging of each other.

The manifold may incorporate a flow control feature. The flow control feature may be incorporated into the form of the manifold produced by the additive manufacturing process. Thus, the design of the manifold can be improved without adding complexity to the manufacturing process.

The flow control feature may be a fluid filter. Thus, a manifold may filter the fluid flowing through it without requiring any additional components. The fluid filter may be incorporated into the form of the manifold produced by the additive manufacturing process. The fluid filter may comprise a plurality of filter flow paths formed within the manifold.

The filter may be in the form of a grate incorporated into a single piece manifold. The grate may comprise a plurality of intersecting filter walls defining holes therebetween. The holes of the grate may be round. Thus, the cross-sections of the filter flow paths may be round. The holes of the grate may be square. Thus, the cross-sections of the filter flow paths may be square. The grate may be located in a flow gallery transverse to the direction of flow. The grate may extend axially in the direction of flow. The filter walls may extend axially in the direction of flow. The axial length of a filter wall may be very much greater than its thickness. Thus, the filter may be relatively strong in the direction of flow. The length of a filter wall may be more than five times its thickness. For example, the length of a filter wall may be 10 times its thickness.

The fluid filter may be domed. Thus, large particles may be pushed to the edge of the filter by the current.

The flow control feature may be a flow restrictor. The flow restrictor may be incorporated into the form of the manifold. Thus, the performance of the manifold may be improved without the need for any additional components. The flow restrictor may include one or more flow paths having a plurality of abrupt direction changes such that transition to turbulent flow is promoted. The flow path may include a bend of at least 90 degrees over a distance of less than 5 mm. The flow restrictor may be formed by a plurality of baffles. Each baffle may extend from the side of the flow gallery perpendicular to the direction of flow. The flow restrictor may comprise at least one pair of baffles. Each pair may comprise two baffles, one baffle extending from each side of the flow gallery to form an orifice between the two baffles.

The convoluted flow path of the flow restrictor may allow a given flow resistance to be achieved with a larger orifice between the baffles. Thus, the flow restrictor allows the promotion of turbulent flow without the use of the relatively small flow-constricting orifices typically used in such devices. Thus, the flow restrictor may promote turbulent flow of the fluid without being susceptible to contamination which can block such small-diameter orifices.

The servo valve may further include a spool. The spool may be located within a cylindrical cavity within the manifold. The spool may be mounted concentrically within the manifold cavity. Thus, an annular cavity may be formed between the spool and the inner surface of the manifold which defines the cavity.

A fluid port may be located in the inner surface of the manifold which defines the cavity. The fluid port may be a fluid inlet or a fluid outlet. The fluid port may have a non-circular cross-section. The fluid port may be of elongate shape. That is to say that the fluid port may extend over a greater circumferential distance than axial distance. For example, the fluid port may have a substantially rectangular cross-section. The fluid port may be a substantially rectangular slit in the inner surface of the manifold which defines the cavity. Therefore, the fluid port may be much smaller in the axial direction and therefore allow the corresponding features of the spool and manifold to be more closely packed in that direction than a typical, cylindrical, fluid port.

The flow control feature may be a sleeve. The sleeve may be located within the cavity of the manifold. The sleeve may be substantially cylindrical in shape. The sleeve may be hollow. The spool, sleeve and manifold cavity may be concentric. The spool may be located within the sleeve. The sleeve may divide the annular cavity surrounding the spool into at least two concentric annular zones. It may be that the sleeve does not extend along the majority of the length of the spool. The sleeve may divide the annular cavity surrounding the spool into at least two concentric annular zones over a portion of the length of the spool.

The manifold cavity may include at least one fluid inlet via which pressurised fluid enters the cavity. Proximate to each fluid inlet there may be a high pressure zone. Each high pressure zone may have a sleeve. The sleeve may act to pressure-balance the interface between any incoming fluid and the spool. The inner surface of the manifold may include a plurality of fluid inlets. A manifold cavity may contain a plurality of sleeves. The sleeves may be spaced apart longitudinally along the length of the spool. The central annular zone may be between the inner surface of the sleeve and the outer surface of the spool. The outer annular zone may be between the outermost surface of the sleeve and the inner surface of the manifold which forms the cavity. Thus, a spool may be mounted concentrically within a portion of the manifold such that an annular cavity is formed between the spool and the manifold and the flow control feature is a sleeve which divides the annular cavity into at least two concentric annular zones along a portion of the length of the spool. Each sleeve may include one or more apertures to allow fluid to flow into the central annular zone from the outer annular zone. A sleeve may include a single aperture, extending around the circumference of the sleeve. Alternatively a sleeve may include a plurality of holes, spaced apart around the circumference of the sleeve, to allow fluid to flow from the outer annular zone to the central annular zone. The manifold cavity may include at least one fluid outlet via which fluid exits the cavity. The at least one fluid inlet and the at least one fluid outlet may be formed in the inner surface of the manifold which defines the cavity. The fluid inlets and fluid outlets may be connected to an external hydraulic system via the fluid flow galleries contained within the manifold. Thus, the servo valve may be used to control an external hydraulic system. The inner surface of the manifold may include a plurality of fluid inlets and a plurality of fluid outlets allowing the cavity to be connected via the flow galleries of the manifold with a plurality of external hydraulic systems.

A check valve may be included within the manifold. The check valve may be formed at least in part by the manifold. The check valve may include a cavity defined by an inner surface of the manifold and a valve member. The valve member may be elastically deformable. That is, the valve member may change shape under a load, and thereby store mechanical energy. When the load is removed the valve member may return to its original shape. The valve member may be axially compressible. Thus, the length of the valve member may reduce under load. The valve member may be radially compressible. Thus, the radius of the valve member may reduce when subject to a load. The valve member may be torsionally deformable. Thus, one end of the valve member may rotate relative to the other when subject to a load.

The cavity may form part of a flow path within the manifold. One end of the cavity may include a valve opening. The valve opening may be defined by the inner surface of the manifold. The cavity may also include a valve locating portion. The valve locating portion may be defined by the inner surface of the manifold. The valve locating portion may be a region of reduced diameter. The inner surface of the cavity may include at least one projection. The inner surface of the manifold may include a single projection which extends circumferentially around the cavity. Alternatively, the inner surface of the manifold may include one or more individual projections, arranged circumferentially around the cavity. Thus, the region of reduced diameter may be formed by at least one projection on the inner surface of the manifold. The at least one projection may have a triangular cross-section. The diameter of the cavity may reduce gradually to a point of minimum diameter as the distance to the spring decreases. Beyond the point of minimum diameter, the diameter may increase relatively abruptly as the distance from the spring continues to reduce. The shape of the cavity may correspond to the shape of the valve member. The cavity may be substantially symmetrical.

The valve member may be located within the cavity. The valve member may be formed within the cavity during the additive manufacturing process. The surface at a first end of the valve member may include at least one protrusion. The other, second end, of the valve member may be axially displaceable relative to the first end. Alternatively, the other, second end, of the valve member may be axially rotatable relative to the first end. The outer surface of the valve member may include a single protrusion which extends circumferentially around the valve member. Alternatively, the outer surface of the valve member may include one or more individual protrusions, arranged circumferentially around the cavity. The valve member may be barbed. The valve member may be substantially symmetrical. The valve member may be more flexible than the manifold.

In a first state the second end of the valve member may be in contact with the inner surface of the manifold which defines the valve opening. Thus, in the first state the second end of the valve member may be blocking the valve opening such that fluid cannot flow through the valve opening. In the first state, the valve member may be located within the manifold by the contact between the valve locating portion and the at least one protrusion. In the first state, the at least one protrusion on the valve member may be in contact with the inner surface of the manifold cavity at the area of reduced diameter. In the first state, the at least one protrusion on the valve member may be in contact with the at least one projection on the inner surface of the manifold cavity at the area of reduced diameter. Thus, in the first state, the valve member may be compressed between the inner surface of the manifold at the valve opening and the area of reduced diameter.

In a second state, it may be that the second end of the valve member is not in contact with the inner surface of the manifold cavity which defines the valve opening. In the second state there may be a gap between the inner surface of the manifold cavity and the valve member. Thus, in the second position, the gap between the inner surface of the manifold cavity and the second end of the valve member may permit fluid to flow through the check valve. In the second state the at least one protrusion on the valve member may remain in contact with the inner surface of the manifold at the area of reduced diameter. The area of reduced diameter may prevent the valve member from expanding away from the valve opening. The valve member may include one or more flow galleries that permit fluid to flow through the valve member at the region of reduced diameter. The manifold may include one or more flow galleries that permit fluid to flow within the manifold at the region of reduced diameter.

The valve member may change from the first state to the second state when a compressive force is exerted on it. The compressive force may act upon the valve member in a second direction, opposite to the first direction. Thus, the check valve may only open when fluid flowing in the second direction exerts sufficient force on the valve member to further compress the valve member and open a gap between the valve member and the inner surface of the manifold which defines the valve opening.

Alternatively, the valve member may change from the first state to the second state when a torsional force is exerted on it. Thus, the check valve may only open when fluid exerts sufficient force on the valve member to further rotate one end of the valve member and thereby create a gap between the valve member and the inner surface of the manifold which defines the valve opening.

The valve member may be of a single piece construction. The valve member may include at least one deformable region. The deformable region may comprise a spring formed as one part with the rest of the valve member. The spring may be formed as one part with the rest of the valve member using an additive manufacturing process. The deformable region may comprise a region of reduced thickness. The valve member may include a deformable region that accommodates axial deformation. The valve member may include a deformable region that accommodates radial deformation. The valve member may include at least one rigid region which is substantially more rigid than the at least one deformable region. For example the valve member may include two rigid regions linked together by one or more deformable regions. It will be understood that as the valve member may be produced using an additive manufacturing process the deformable regions may have a different configuration to the rigid regions but still form a single piece. A manifold may include more than one flow control feature. A manifold may include more than one type of flow control feature. For example, a single piece manifold may include any combination of a fluid filter, a flow restrictor and a sleeve. A single piece manifold may include a check valve and any one of a fluid filter, a flow restrictor and a sleeve.

Manifolds in accordance with the second aspect of the invention may be produced in accordance with the method of the first aspect of the invention.

Any features described with reference to one aspect of the invention are equally applicable to any other aspect of the invention, and vice versa.

DESCRIPTION OF THE DRAWINGS

Various embodiments of the invention will now be described, by way of example only, with reference to the accompanying schematic drawings of which:

FIG. 2b is a schematic cross-sectional view of the fluid filter of FIG. 2a;

DETAILED DESCRIPTION

Figure 1:
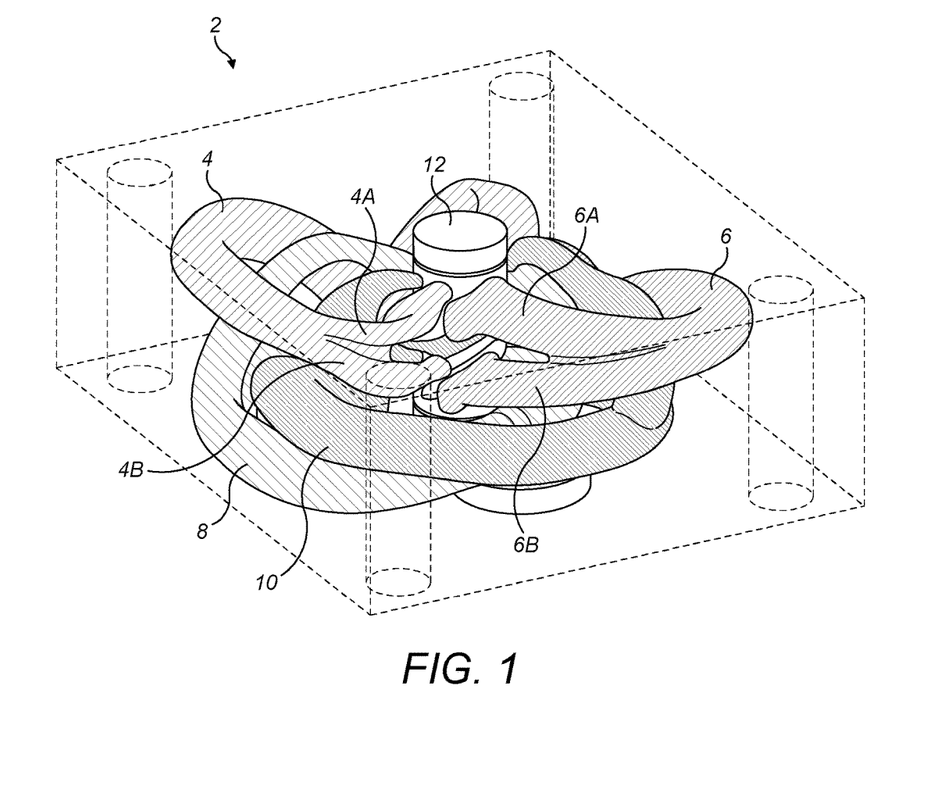
FIG. 1 is a representation of a single piece manifold including a plurality of flow galleries.

FIG. 1 shows a manifold 2 containing flow galleries 4, 6, 8, 10 connected to a central cavity 12. The flow galleries are curved, and bend around within the body of the manifold so that they are tightly packed. The aspect ratio of the cross-section of each gallery 4, 6, 8 and 10 varies along its length as the gallery curves. Two of the galleries 4, 6, split into two branches, 4a and 4b and 6a and 6b respectively.

Curving the flow galleries allows them to be packed more efficiently within the body of the manifold and therefore reduces the size of the manifold overall. Varying the aspect ratio of the galleries as they curve helps to maintain fluid momentum. Branching the galleries assists in efficient packing of the galleries within the body of the manifold and also offers the opportunity to use different flow control devices in different branches if so required.

Figure 2A:
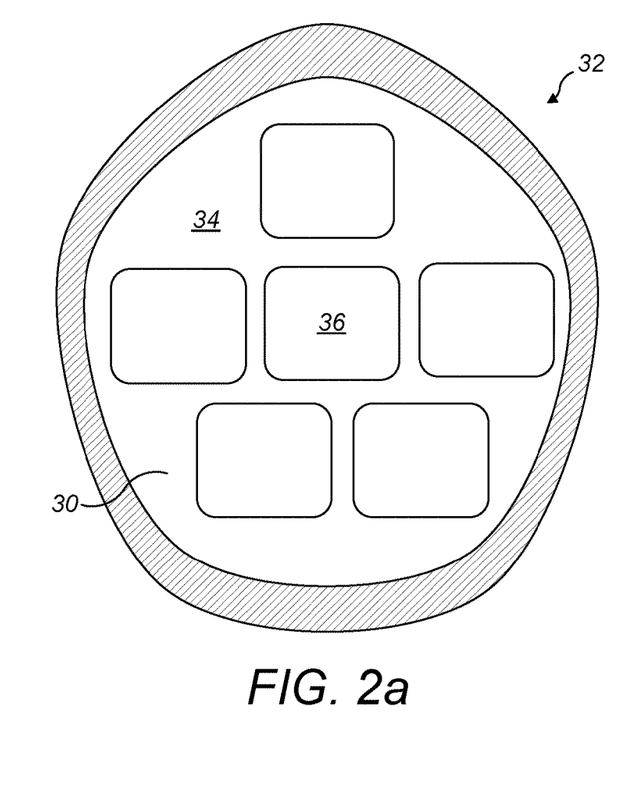
FIG. 2a is a schematic view of a single piece manifold including a fluid filter.

FIG. 2a shows a schematic view of a fluid filter 30 formed as part of a single piece manifold 32. The fluid filter 30 comprises a solid matrix 34 containing multiple holes 36, the holes having a square cross-section.

Figure 2B:
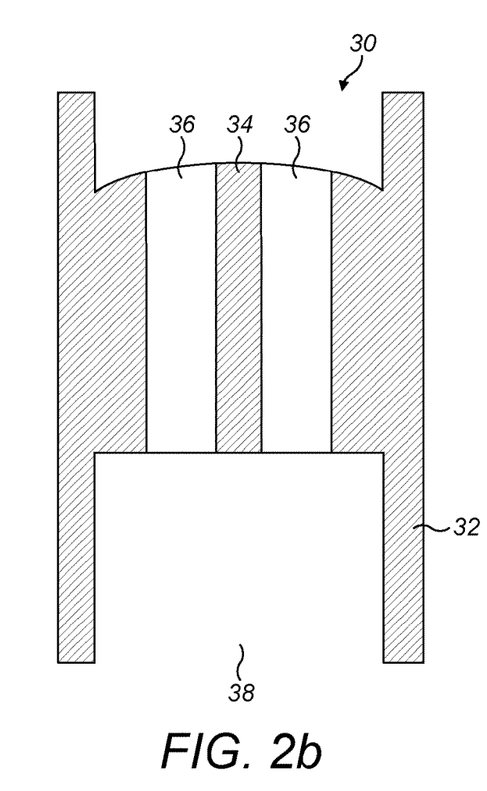

FIG. 2b shows a cross-sectional view of the fluid filter 30 formed within a section of a single piece manifold 32. The fluid filter is located within a flow gallery 38. The solid matrix 34 extends across the width of the flow gallery 38. The upstream end of the solid matrix 34 is domed. The solid matrix 34 and the holes 36 contained therein extend axially along the flow gallery 38. The holes 36 therefore form fluid flow paths which are rectangular when viewed in cross-section in FIG. 2b.

Figure 3:
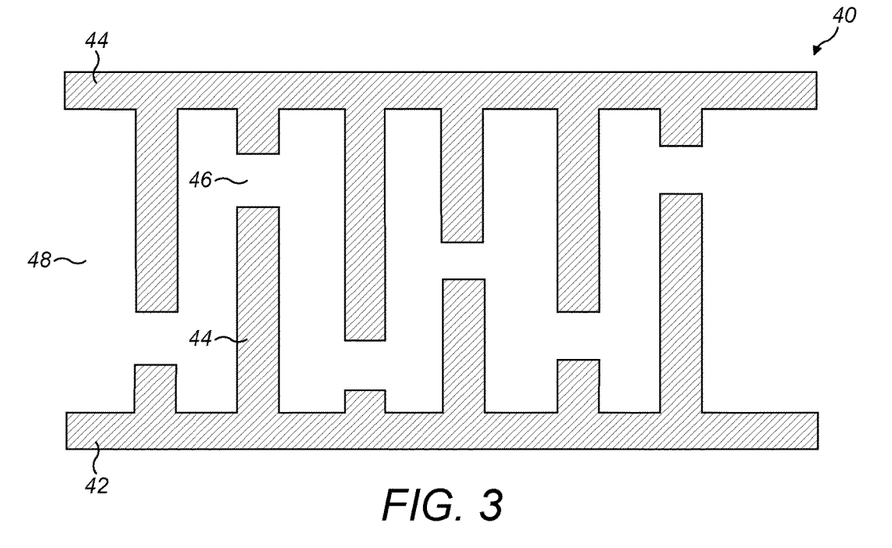
FIG. 3 is a schematic cross-sectional view of a single piece manifold including a flow restrictor.

FIG. 3 shows a cross-section view of a flow restrictor 40 formed as part of a single piece manifold 42 within a flow gallery 48. The flow restrictor 40 comprises a plurality of baffles 44, arranged in pairs, the pairs being spaced apart longitudinally along the length of the flow gallery 48. The baffles 44 are rectangular when viewed in cross-section in FIG. 3. The baffles 44 of each pair extend perpendicularly from either side of the flow gallery 48 to form a valve opening 46. The transverse location of the orifice 46 varies for each pair. Thus, the orifices 46 are not aligned along the centre line but form a convoluted flow path down the flow gallery.

Figure 4:
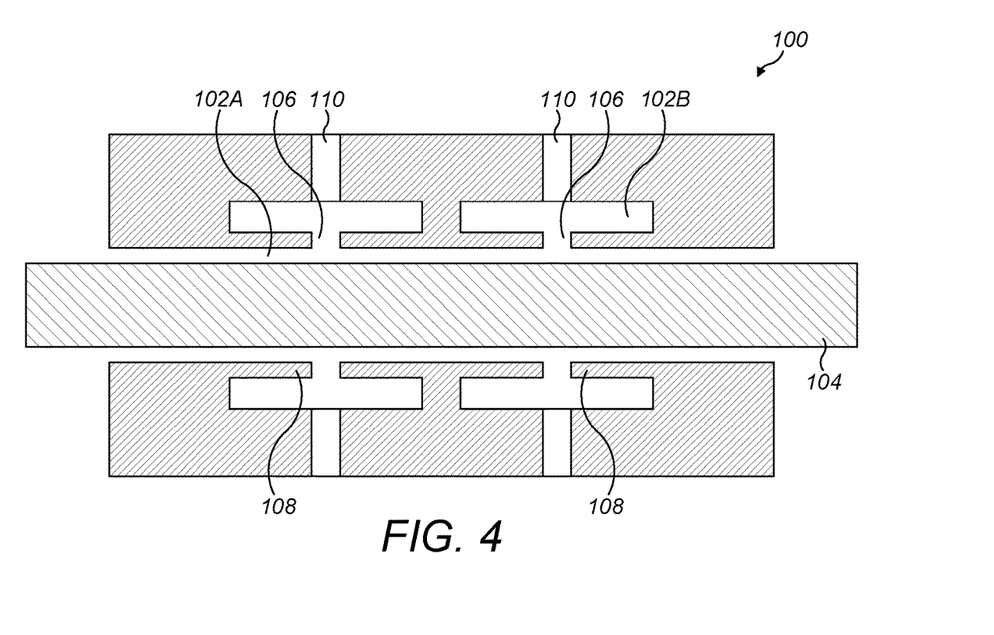
FIG. 4 is a schematic cross-sectional view of a single piece manifold including a sleeve.

FIG. 4 shows a cross-sectional view of single-piece manifold 100 for use in a servo valve which includes two sleeves 108 formed as part of the manifold 100. A cylindrical cavity 102 is formed within the manifold 100 and contains a cylindrical spool 104. The sleeves 108 are spaced apart longitudinally along the axis of the spool 104. The cavity 102 is split by each sleeve into two, concentric annular zones 102a, 102b. The first zone, 102a, is formed between the surface of the spool 104 and the innermost surface of the sleeve 108 which is formed as part of the single piece manifold. The second zone, 102b is formed between the outermost surface of the sleeve 108 which is formed as part of the single piece manifold and the wall of the inner surface of the manifold 100. Viewed in cross section each cylindrical sleeve 108 appears as four rectangular protrusions which extend, parallel to the longitudinal axis of the spool 104. Associated with each sleeve, and extending circumferentially, a gap 106 allows fluid to pass between the two annular zones 102a and 102b. An inlet port 110 is in fluid communication with annular zone 102b and with annular zone 102a via gap 106. The presence of the sleeve helps maintain a pressure-balance within the manifold at the interface between the spool and the inlet valve. Forming the sleeve as part of the manifold using additive manufacturing techniques allows the improvement in performance associated with including a sleeve in the manifold to be retained without adding to the complexity of the manufacturing process.

Figure 5:
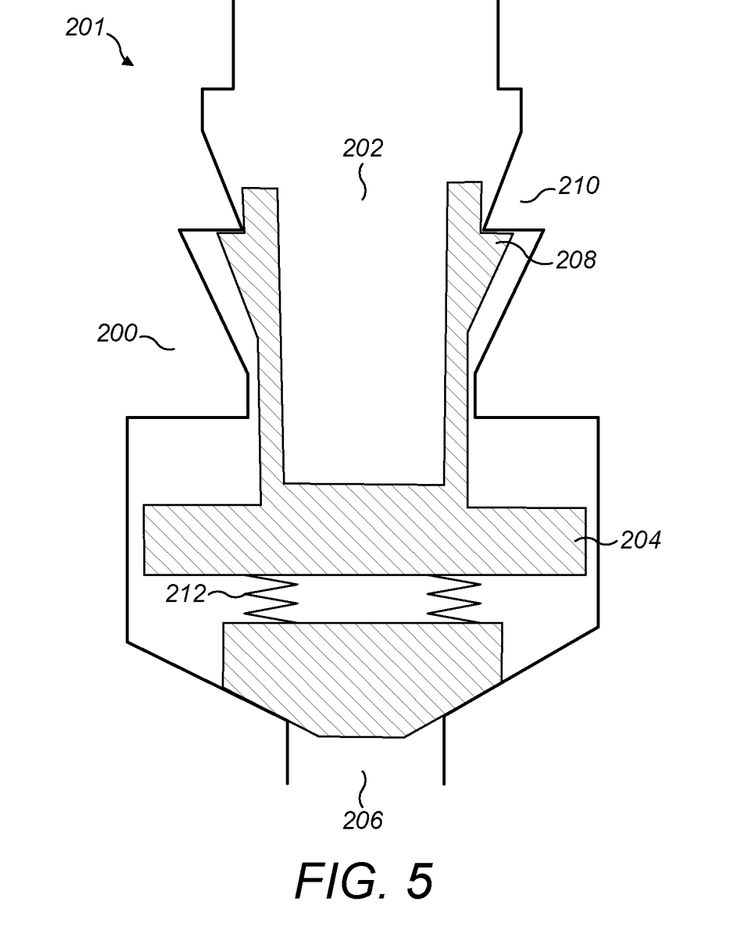
FIG. 5 is a schematic cross-sectional view of a single piece manifold including a check valve.

FIG. 5 shows a cross-sectional view of a check valve 201 formed in part by a manifold 200. A valve member 204 is located within a cavity 202. A protrusion 208 is located at one end of valve member 204 and is in contact with a projection 210 of the inner surface of the manifold which defines the cavity 202. The opposite end of the valve member is tapered and is in contact with the tapered inner surface of the manifold which defines a valve opening 206. The protrusion 208 is on the same side of the projection 210 as the valve opening 206. The protrusion 208 extends circumferentially around the valve member and is triangular when shown in cross-section in FIG. 5. The projection 210 extends circumferentially around the inner surface of the manifold 202 and is triangular when shown in cross-section in FIG. 5. The shape of the projection 210 is such that the diameter of the cavity gradually reduces towards the valve opening 206 before abruptly increasing over a very short distance. The sides 212 of the valve member 204 are parallel to each other. The protrusion 208 is in contact with the inner surface of the manifold 200 which forms cavity 202. The valve member 204 includes a pair of deformable spring elements 212 connecting the tapered end of the valve member to the end of the valve member 204 containing projection 208. In this, the first state, the deformable valve member is compressed between the valve opening 206 and the projection 210 and the spring elements 212 are therefore compressed. The contact between the tapered end of the valve member 204 and the inner surface of the manifold defining the valve opening 206 prevents the flow of fluid past the valve.

During installation the flexible valve member is located in the cavity with the protrusion 208 on the opposite side of the projection 210 to the valve opening 206. Force is exerted on the valve member 204 such that it moves towards the valve opening 206 thereby compressing the spring elements 212. Force continues to be exerted on the valve member 204 until the protrusion 208 is on the other side of the projection 210. It is possible for the protrusion 208 to pass the projection 210 because the thin sides 212 of the valve member are flexible, and deform such that they are no longer parallel. This deformation is aided by the shape of the projection which gradually reduces the diameter of the cavity.

Fluid flowing through the check valve 201, will be prevented from passing the valve opening 206 which is blocked by the valve member 204 until the spring elements 212 are sufficiently compressed by the hydraulic pressure generated by the fluid to create a gap between the surface defining the valve opening 206 and the end of the valve member 204. In the presence of sufficient hydraulic pressure the valve member 206 is compressed such that the tapered end moves towards the projection 210 thereby creating a gap between the valve member 204 and the inner surface of the manifold 200 which forms the valve opening 206 such that fluid may flow through the valve. Fluid flowing in the opposite direction will not be able to pass through the check valve due to the contact between the tapered end and the inner surface of the manifold which defines the valve opening 206.

Whilst the present invention has been described and illustrated with reference to particular embodiments, it will be appreciated by those of ordinary skill in the art that the invention lends itself to many different variations not specifically illustrated herein. Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. A method for producing a servo valve manifold, the method comprising:
    forming a manifold through additive manufacturing to have a one piece, monolithic body, forming a cylindrical cavity defined in the body to contain a spool, and forming a first flow gallery and a second flow gallery each defined in the body during the additive manufacturing to have a length and a cross section that varies in shape along at least a portion of said length, and each gallery being defined in the body during the additive manufacturing to follow a curvilinear path comprising a nonlinear path in three-dimensional space;
    wherein each gallery curves within the body around the cylindrical cavity from a first location within the body and spaced apart from the cylindrical cavity to a second location within the body and spaced apart from the cylindrical cavity, the first and second locations of each one of said galleries being spaced apart from each other (i) around a circumference of the cylindrical cavity and (ii) along a length of the cylindrical cavity, each gallery thereby defining a flow path along a circumferential direction with respect to the central axis of the cylindrical cavity, and
    wherein the first and second flow galleries are intertwined.

2. A method for producing a manifold according to claim 1, further comprising the step of: forming at least one flow control feature as part of the single piece manifold during the additive manufacturing process.

3. A method for producing a manifold according to claim 1, wherein each of said flow galleries has an end at a fluid port located on an inner surface of the cavity.

4. A manifold according to claim 1, wherein the first and second locations are spaced apart by an angle of at least 45 degrees around the circumference of the cylindrical cavity.

5. A servo valve manifold, comprising:
    a single piece, monolithic body having defined therein a cylindrical cavity having a circumference and containing a spool, and a first flow gallery and a second flow gallery each defined in the body and following a curvilinear path comprising a nonlinear path in three-dimensional space within the manifold;
    wherein each gallery curves within the body around the cylindrical cavity from a first location spaced apart from the cylindrical cavity to a second location spaced apart from the cylindrical cavity, the first and second locations of each one of said galleries being spaced apart from each other (i) around a circumference of the cylindrical cavity and (ii) along a length of the cylindrical cavity each gallery thereby defining a flow path along a circumferential direction with respect to the central axis of the cylindrical cavity, and
    wherein the first and second flow galleries are intertwined.

6. A manifold according to claim 5, wherein each of said flow galleries has a variable cross-section.

7. A manifold according to claim 5, in which the single piece manifold incorporates a flow control feature.

8. A manifold according to claim 5, wherein each of said flow galleries has a length and the curvature of each flow gallery varies along a majority of the length of the flow gallery.

9. A servo valve manifold according to claim 5, wherein each of said flow galleries has a length and a cross section that varies in shape along at least a portion of the length.

10. A servo valve manifold according to claim 5, wherein each of said flow galleries has an end at a fluid port located on an inner surface of the cavity.

11. A manifold according to claim 5, wherein the first and second locations are spaced apart by an angle of at least 45 degrees around the circumference of the cylindrical cavity.

* * * * *

UNITED STATES PATENT AND TRADEMARK OFFICE
CERTIFICATE OF CORRECTION

| | |
|---|---|
| PATENT NO. | : 10,443,630 B2 |
| APPLICATION NO. | : 14/897163 |
| DATED | : October 15, 2019 |
| INVENTOR(S) | : Andrew John Collins |

It is certified that error appears in the above-identified patent and that said Letters Patent is hereby corrected as shown below:

On the Title Page

In item (73) Assignee should read:
DOMIN FLUID POWER LIMITED, Bristol (GB).

Signed and Sealed this
Twenty-first Day of April, 2020

Andrei Iancu
*Director of the United States Patent and Trademark Office*